(12) United States Patent
Bhri

(10) Patent No.: US 6,997,382 B1
(45) Date of Patent: Feb. 14, 2006

(54) AUTO TELLER SHOPPING CART

(76) Inventor: Amit Bhri, 1908 Cortland Dr., Newburgh, NY (US) 12550

( * ) Notice: Subject to any disclaimer, the term of this patent is extended or adjusted under 35 U.S.C. 154(b) by 0 days.

(21) Appl. No.: 11/054,156

(22) Filed: Feb. 9, 2005

Related U.S. Application Data

(60) Provisional application No. 60/559,215, filed on Apr. 5, 2004.

(51) Int. Cl.
*G06K 15/00* (2006.01)

(52) U.S. Cl. .................................................. 235/383
(58) Field of Classification Search ................ 235/383, 235/385
See application file for complete search history.

(56) References Cited

U.S. PATENT DOCUMENTS 6,484,939 B1 * 11/2002 Blaeuer ...................... 235/383
6,910,697 B2 * 6/2005 Varatharajah et al. ... 280/33.992
2004/0065732 A1 * 4/2004 Bernds et al. .............. 235/383
2004/0252025 A1 * 12/2004 Silverbrook et al. ..... 340/568.5

* cited by examiner

*Primary Examiner*—Thien M. Le
*Assistant Examiner*—Edwyn Labaze

(57) ABSTRACT

The object of this invention is to provide an electronic shopping cart which enables customers scan the products, view the totals and complete the transaction by means of self check-out. This invention relates to an electronic shopping cart which acts as a client in the wireless network environment and communicates with the server by means of an operating system, scan the products selected by the customer, displays the cost of current product and total cost of all the products in the cart and provides various options by means of graphic display and upon completion of product selection, prompts the customers to move to a payment station and complete the transaction by means of self-checkout.

2 Claims, 5 Drawing Sheets

AUTO TELLER SHOPPING CART

The current application is in reference to the provisional patent application No. 60/559,215 filed on Apr. 5, 2004.

| U.S. Pat. No. | NAME | PATENT DATE | CLASS |
|---|---|---|---|
| 6827364 | Martin | Dec. 7, 2004 | 280/641 |
| 3774929 | Stanley | November 1973 | 280/641 |
| 5816604 | Hsieh et al | October 1998 | 280/655 |

BACKGROUND OF THE INVENTION

In today's shopping environments, the customers pick the cart and add items to the cart. When the customers are done with the selection of the items, they proceed to the payment section, where they occasionally have to wait in lines and then they have to put their merchandise on the belt. The items are then scanned by the operator and the customers go through a standard method of payment. Once they have paid for the merchandise, they again have to load the carts. The complete process involves a long wait-time for customers. It also does not allow customers to maintain their budget effectively as the customers do not know the amount of the items they have selected. The time involved often increases when the customers request the operator to remove the item after it has been scanned.

As such, there is a need for new means of interactive shopping which provide complete control to the customers, enable them to manage their budgets and reduce the wait-time involved in the current shopping environments.

The current invention of Auto Teller Shopping Cart will allow customers to select and deselect the items as they will shop around. The items will be scanned as they will be put in the cart. This process will save a lot of wait time for the customer. The cart will also display the cost of the current item and the total of all the items selected which will enable customers shop as per their budgets. Once the customers are done selecting the items, they can finalize the purchase themselves and move to the payment station for a self-checkout. There is currently a need for a method that expedites the shopping experience for customers without much intervention and wait-times.

SUMMARY OF THE INVENTION

The object of this invention is to provide an advanced shopping cart which enables customers scan the products, view the totals and complete the transaction by means of self check-out.

This invention relates to an electronic shopping cart which acts as a client in the wireless network environment and communicates with the server by means of a computer operating system, scan the products selected by the customer, displays the cost of current product and total cost of all the products in the cart by means of graphic display and upon completion of product selection, prompts the customers to proceed to a payment station and complete the transaction.

The cart body is made from a group of metals consisting Steel, Aluminum or Iron. The cart has four wheels which are made of rubber. The handles of the cart are made up of same material as the cart and is connected to the rear of the cart. The handles are connected from bottom up and curve out around the top of the cart. The communication chamber of cart is a rectangular box made of metal and consists of a motherboard, a hard-disk, a wireless network device to connect to the server, a fan, a battery and a battery charger. The product scanners are installed at the top inward facing frame of the cart. When the item is placed in the cart, it gets scanned. The graphic display system is connected to the rear top of the cart and is supported on the metal rods connected between the handles and the top rear of the cart just below the position of the screen. This enables the customers know the current amount of their purchases. The display is also a touch-screen that prompts the users for different options throughout the shopping.

The Auto Teller Shopping Cart is a part of an integrated process. As the customer obtains the cart from the charging station, the operating system in the system will start and will connect to the server by the means of wireless communication interface. The range boosters are also deployed all over the store to enhance the wireless signal strength and to keep the server-cart connection alive virtually till the customer finishes the shopping. As soon as the connection between the server and the cart is established, the retail application is initialized in the cart and the cart is assigned a CartNumber which is displayed on the cart screen. The CartNumber is a unique identifier for the cart and is not duplicated for any other cart in the shopping facility. When the customer will pick an item and put it in the cart, it will be scanned by the cart and the total for the product will be shown on the cart display. Now as the customer moves on in the store and keep on adding the stuff, the cart will display the combined totals for all the items scanned so far. The cart totals will be updated in the server every time a product will be added to the cart.

When the customers are done adding the products, they proceed to the payment section. Once the customer has reached the "Payment Platform", the cart number will be read by the system on the platform and the total will be displayed, which will match the total on the cart display. Next the customer will be prompted to select the payment mode. Once the payment is made, the customer will get the receipt. As soon as this process will be complete, the cart number will be released and the cart will automatically come out of scan mode and the customer will be able to remove the goods from the cart. The cart will then be returned to the store where it will again get a unique number from the server and will be ready for use by other customers.

DETAILED DESCRIPTION

This invention solves many issues related to the customer's shopping experience. The customers can directly interact with the complete system which in turn reduces their wait-time, expedite their shopping and gives them an exact estimate of their shopping total. In order to use this cart, it must be connected to the server by means of wireless network and software application that runs on the cart and accesses the data related to items being added to the cart by customers. The detailed description of the invention includes the design of the cart and the benefits and advantages delivered by the cart in the complete shopping process.

1. The Cart

This invention relates to an electronic shopping cart which acts as a client in the wireless network environment and communicates with the server by means of an operating system, scan the products selected by the customer, displays the cost of current product and total cost of all the products in the cart by means of graphic display and upon completion of product selection, prompts the customers to move to a payment station and complete the transaction. Auto Teller Shopping Cart is an integral part of the whole process. The complete shopping process has been formulated around Auto Teller Shopping Cart. This invention will lead to the removal of conventional belts used at the shopping facilities as the cart will have inbuilt scanners installed so that the items are scanned as they are placed in the cart by the customer.

Figure 1:
FIG. 1 shows the complete shopping cart diagram
Figure 2:
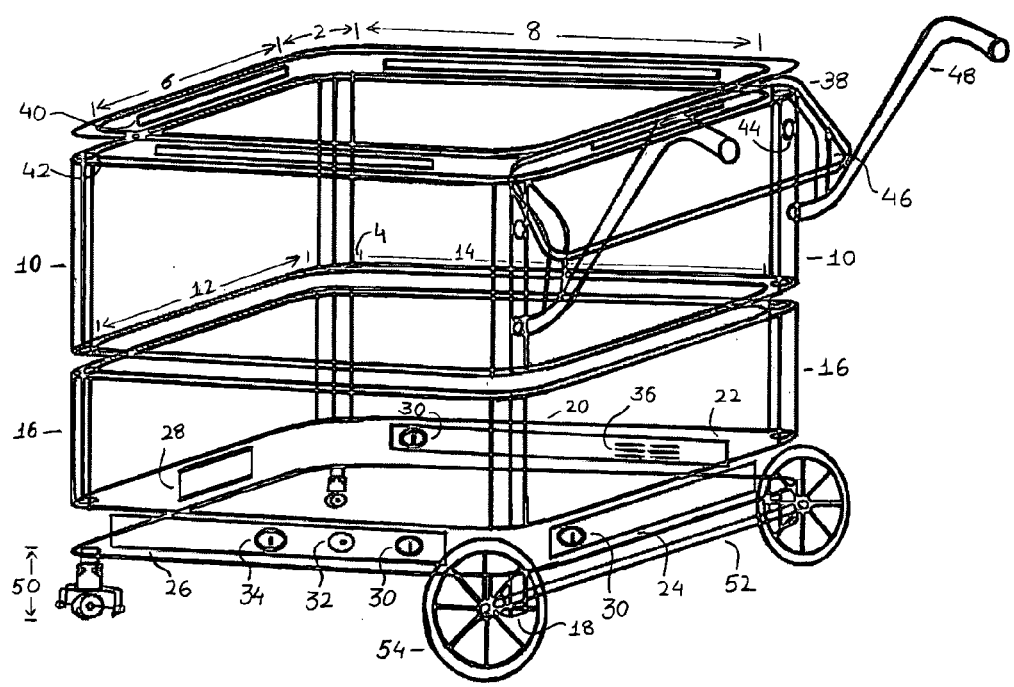
FIG. 2 shows the transparent view of the cart showing the backend details as well FIG. 3 describes the basic frame of the auto teller shopping cart FIG. 4 gives the details of the computer box from outside FIG. 5 describes the computer box from inside

FIG. 1 shows the complete diagram of how the finished cart will look like. FIG. 2 shows the overall transparent view of the cart and shows all the details of the finished cart.

Figure 3:
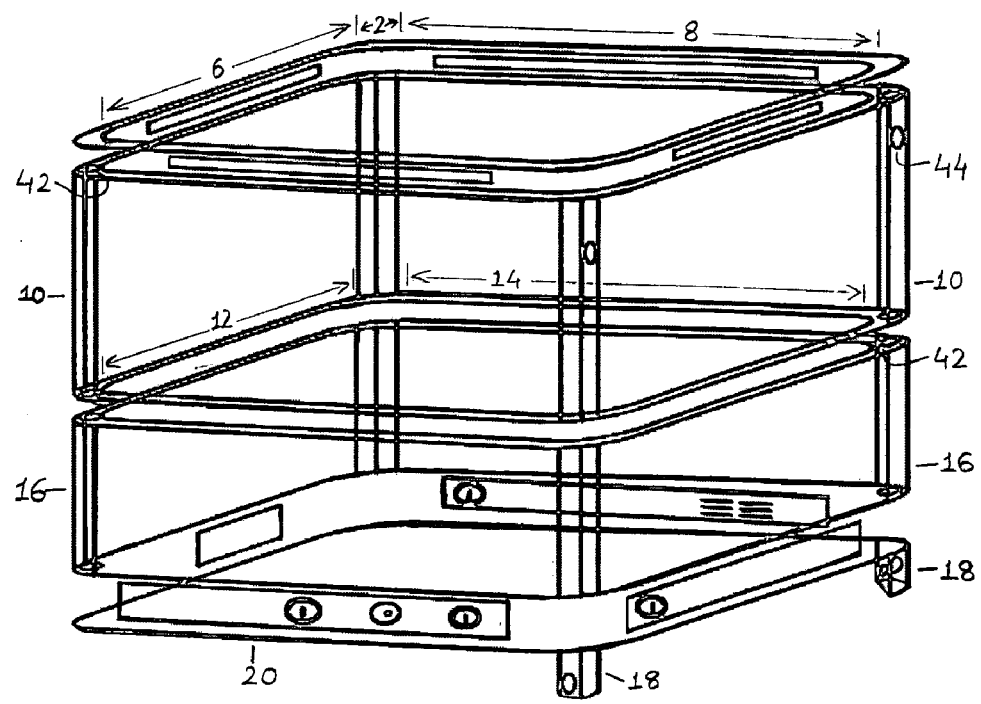

FIG. 3 shows the basic frame of the cart. It shows how the cart is built from base up. Section 6 and 8 are hollow rounded-rectangular rods connected to each other by the angle shown by section 2. The angle is hollow from within and the lower part of the angle contains a circular hole described by 42. Two rods of each type of section 6 and section 8 attached by four angles makes the top section of the frame. The rods of the top section are fitted with the scanners before being connected to each other and will be detailed separately by FIG. 7a and FIG. 7b later in the description. The middle section of the cart forms the base to hold the merchandise. The frame of the middle section is made up from two hollows rods shown by the section 12 and 14 and connected to each other by hollow angles shown by section 4. The hollow angles for the middle section have circular holes on both top and bottom surfaces. The top and the middle frames are connected by the hollow triangular rods shown by section 10 at the corners. The sides and the bottom of the resulting structure are attached to the metallic sheets while the top remains opened. This forms the conventional cart structure. Now the communication chamber is to be attached to the above structure. The communication chamber is shown by the 20 of FIG. 3. The communication chamber is a cornered rectangular box with circular holes on the corners. The said box is connected to the above mentioned structure by means of four rods shown by 16 of the same shape as rods shown by 10 but shorter in height. Now the back portion of the cart is attached to two triangular rods shown by 18. These rods are solid and are very small in height and are used to connect the rear wheels of the cart.

Figure 4:
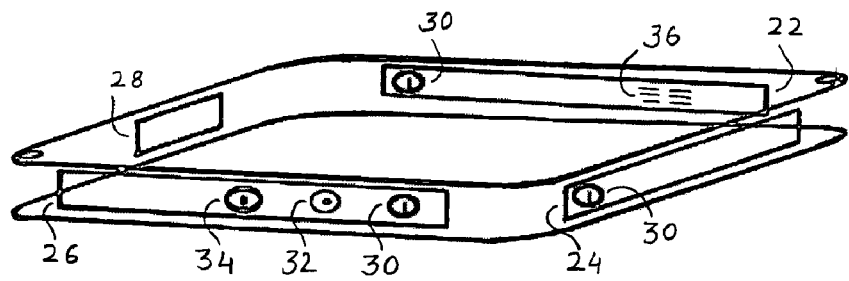

FIG. 4 shows the outer scheme of the communication chamber. 22 shows the part of the box that can be opened and has a lock shown by 30. It also acts as a ventilator shown by 36. 22 can be opened to replace the battery or the fan that are fitted inside the box. 24 can also be opened and is used to connect the display wires and scanner wires to the motherboard installed in the box. 26 has a lock, a power switch to power on the cart and a slot to charge the cart battery shown by 30, 34 and 32 respectively. It can be opened to replace the hard drive installed inside the box. 28 is a transparent glass fitted on the front side of the communication chamber and enables the network communication device detect the wireless network to maintain the high signal strength and thus the connectivity to the server.

Figure 5:
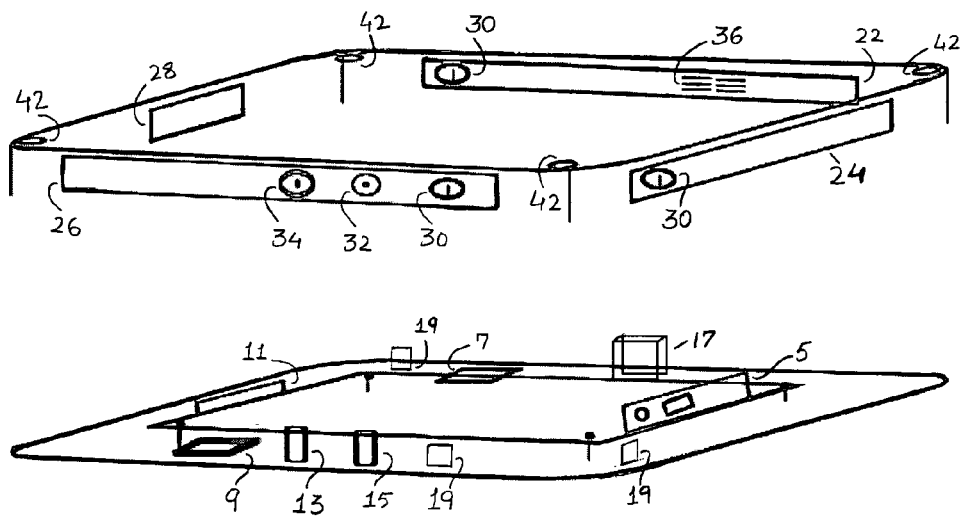

FIG. 5 shows the inner scheme of the computer box. 3 shows the motherboard connected at a little distance from the base by means of screws. 7 shows the battery of the cart that can be replaced by opening 22. 17 shows the fan which aids in keeping the complete circuit cool by exhausting the heat generated by means of a ventilator shown by 36. 5 shows the slots to connect to the scanners and the display. 9 is the hard-disk of the computer and has the necessary operating system and software applications needed for the complete process. The power switch circuit is shown by 13. When the switch 34 is pressed, it presses 13 and the computer starts up. 15 connects to 32 and completes the circuit necessary to charge the battery. Finally the network sensor shown by 11 detects the wireless network to maintain the high signal strength.

Figure 6:
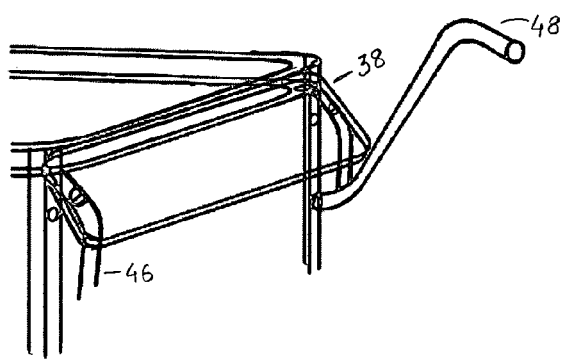
FIG. 6 shows the display attached to the handle of the cart

FIG. 6 describes the touch screen display to show the price of the current item, total cost and other functional options like removing the item and complete the shopping. The touch screen is shown by 38 and is installed at the rear top of the cart and is attached to the angular supports shown by 46 by means of screws. These inclined supports are connected between the lower part of the top frame and the cart handle shown by 48. The lower part of the screen is attached to the handle by means of screws. This makes the screen fit into a place and its placement at the rear top between the handles makes it easier for the customers to view the information and select the presented options.

Figure 7:
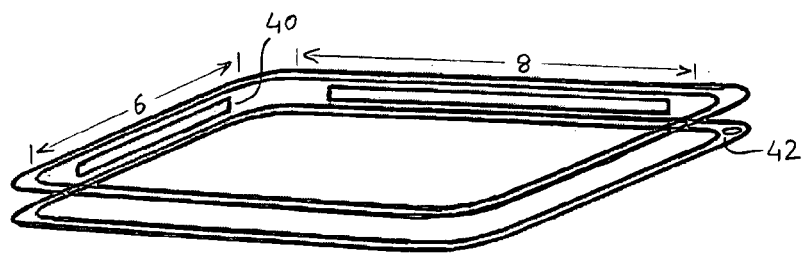
FIG. 7 shows the overview of the scanner section
Figure 7A:
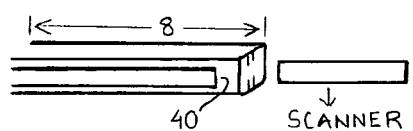
FIG. 7a shows the assembly of the scanner
Figure 7B:
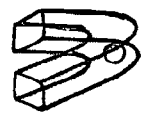
FIG. 7b shows the angle of attached to the scanner section

FIG. 7 shows the scanners installed in the top frame of the cart. The inward facing sections 6 and 8 of the top frame have a metal section removed to fit in the glass sheet to let the scanner beams from scanner 40 be projected in order to scan the item to be placed in the cart. FIG. 7a shows the detailed view of section 6 of the top frame. The inside hollow portion of the rod has place holder for inserting and holding the scanner in place. The inward facing side of the rectangular rod shows a rectangular cut. This rectangular cut portion is fitted with glass and will show the scanner fitted inside the rod. This will enable scanner beams to scan the products while being placed in the cart. Once the scanner is fitted into the rod, this rod is connected to the hollow angular section as shown in FIG. 7b. The bottom part of this hollow angular section has a circular hole to enable the scanner wires pass through the vertical support on to the computer section.

Figure 8:
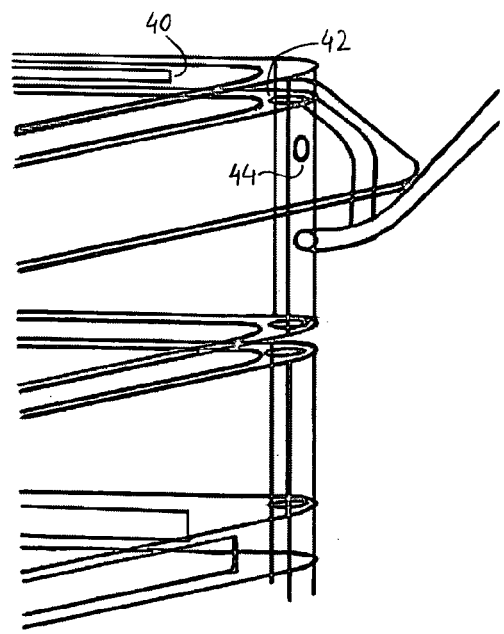
FIG. 8 shows the wiring scheme for the auto teller shopping cart

FIG. 8 shows the wiring diagram for the cart. The wire from the scanner 40 passes through the hole 42 in the angular section. It then travels through the combination of vertical support and angular sections on to the computer section. The wires from the display pass directly through the hole shown by 44 in the vertical support and then along with the scanner wires to the computer section.

Figure 9:
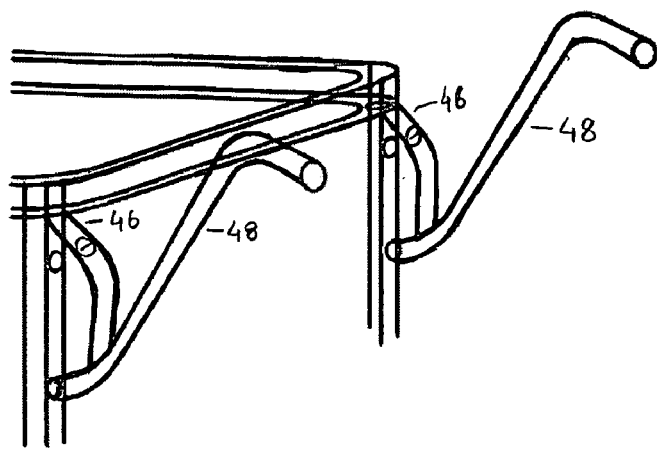
FIG. 9 shows the handle details of the said cart

FIG. 9 shows the handle described by 48 to maneuver the cart and the angular section to hold the display. The angular support is described by 46. The angular support is attached to the bottom part of the rear top of the frame on one side and to the handle on the other side. It has a hole on the side connected to the cart to screw the display screen to the cart.

The handle is attached to the vertical support more than half-way from the top. It then moves upwards at an angle where it touches the bottom of the display screen on its way. The handle then takes an inverted shape as shown in the FIG. 9 to enable the easy handling by the customer.

Figure 10:
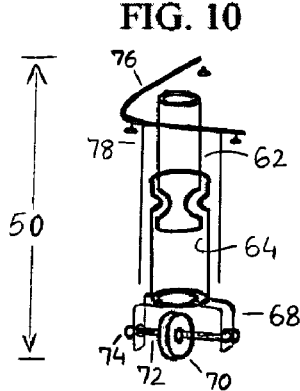
FIG. 10 shows the front wheel attached to the cart

FIG. 10 shows the front wheel of the cart. The front wheel of the cart can be rotated to help the customers maneuver the cart easily. 62 is a circular metallic rod connected to the rounded-triangle metallic sheet 76 which is connected to the bottom of the computer box on the front side corners by means of screws or rivets and the lower side of 62 has a carved-in section. The upper end of 64 has a carved out section on the inner side. The lower end of 62 is inserted into the upper end of 64 such that the carved-in section of 62 overlaps the carved-out section of 64. The lower end of 64 is connected to two inverted L-type metallic strips shown by 68 on the lower end. The combined structure is connected to the wheel shown by 70 by means of a circular metallic rod 72 which runs across the holes at the rear end of 68. The ends of the metallic rod are covered by metallic caps shown by 74 to hold the rod in place.

Figure 11:
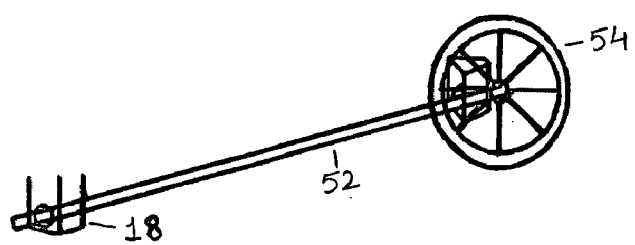
FIG. 11 shows the rear wheel attached to the cart

FIG. 11 shows the rear wheel of the cart. The wheel shown by 54 is connected to the cart by means of a metallic circular rod 52. The rod runs across the circular holes in the rounded-triangle hollow rod shown by 18 and connects the rear wheels to the cart.

2. Shopping Process

The underlined steps form the complete shopping process for customers. While the Auto Teller Shopping Cart will make things very easy for the customers, the background process becomes fairly complex. The complete background process is divided into five phases:

2.1 CART PICKUP: This is the first phase of the process. This is an important phase because it activates the cart. As the customer picks up a cart from the cart charging section and press the power switch, the operating system in the cart starts up. It establishes a connection with the server by the means of wireless networking communication. As soon as this connection is established, the retail application is initiated in the cart. This application connects to the database on the server which contains data pertaining to the items in the shopping facility. As this connection is set up, a unique number called CartNumber is assigned to the shopping cart. All the carts in the shopping facility at any given time have unique CartNumber. The CartNumber distinguishes one cart in the facility from others. The display on the cart shows the welcome message to the customer and the CartNumber, activates the scanner and displays the total amount as zero and then prompts the customer to start shopping. The graphic display also shows the battery level and strength of the wireless connection.

2.2 SHOPPING PHASE: The shopping phase is a sub-system comprising of 3 sub-phases:

2.2.1 ITEM PICK UP: In this sub-phase, the customer adds item to the cart. As the item is added to the cart its barcode is scanned by the scanners on the top border of the cart. The item pertaining to the barcode is displayed on the display along with its cost and the overall total is also displayed. As the customer adds another item, its barcode is scanned and the item price is displayed on the display. The display also shows the updated total of all the items collected in the cart so far. As the item is scanned by the cart, the total count of that particular item is reduced in the database inventory and the item is added to the CartNumber. This process is repeated for all the items selected by the customer.

2.2.2 ITEM REMOVAL: In this process, the customer removes any item from the cart. After adding the items to the cart, if the customer decides to remove the item from the cart, the customer presses the button 'Remove Item' on the touch-screen display. As the customer presses the button on the screen, the customer is prompted to remove the desired item from the cart. The customer takes the item from the cart and it is scanned and removed from the list. The display shows the cost of the item removed as a negative amount and the total of all the remaining items is reduced. As the item is removed from the cart, it is removed from the list under the CartNumber and added back to the inventory of that particular item in the database.

At the beginning of this phase, the customer pressed the 'Remove Item' button on the touch-screen display to remove the items from the cart, the display now shows the option 'Add Items'. Once the customer has removed the items of interest, the customer can press 'Add Items' to start adding the items again.

It is important to note here that the sub-phases 1 and 2 can be repeated as many times as desired but the good practice is to add the items first and then to remove the desired items in the end. When the customer has removed all the items of interest, the customer can press 'Add Items' button on the touch-screen display to continue the shopping process.

2.2.3 COMPLETION PROCESS: When the customers have purchased all the items of interest and do not need any more items, they can press the 'Done' button on the display. This computes the totals after applying the taxes and displays the grand total to the customer. The display also has provision to enable customer to add any item even after pressing done. The customer can press 'Resume' button to continue shopping. But when the customer is finally done, the 'Done' button needs to the pressed. As soon as this button is pressed, the display prompts the customer to move to the Payment Platform.

2.3 SECURITY CHANNEL SCANNING: While moving to the payment platform, the customers have to pass through a security channel equipped with large scanners. These scanners detect the presence of any un-scanned items.

2.4 PAYMENT: When the customer places the cart on the payment platform, the CartNumber is read by the platform by the means of wireless communication. The payment platform retrieves the data from the server based on the CartNumber, and displays the items and the total on the screen. The customer is prompted to select the mode of payment. Based on the selection, the transaction is processed. The customer gets the receipt and the transaction ends. The scanners are deactivated and the CartNumber is also released. The complete transaction is recorded in the database. The customer is prompted to remove the stuff and the cart is returned to the charging unit.

3. LOCAL AREA NETWORK: All the carts in the shopping facility communicate with the central server by means of wireless networking communication. In order to communicate with the server, all the carts must be on the same network. When the cart is switched on, the server assigns the cart an IP address to the cart, which makes it a part of the network. Like the CartNumber assigned by the program to the cart, the IP address is also unique for every cart. The cart communicates with the server by the means of wireless network communication. The connection between the cart and server must be maintained for longer periods of time. The shopping facility is equipped with the range boosters to provide high signal strength to the carts moving the facility at any particular time to ensure that these carts stay in connection with the server at all times and the shopping process is completed without any lost connections.

4. PAYMENT PLATFORM: The payment platform associated with the present invention provides a means of self-checkout to the customer. When the customers stops adding the products to the cart and press 'Done' on the cart display and pass through the security channel and move to the payment platform, the payment platform receives the CartNumber from the cart. It displays the items purchased by the customer and the total amount due and prompts the customer for the mode of payment. Depending up on the mode selected by the customer, the transaction is completed. The details of the transaction are added to the server and the receipt is printed out for the customer.

5. CART RELEASE: Once the customer obtains the receipt, the CartNumber is released and the cart software application closes the connection to the database on the server and closes itself. The operating system is shut down and as it shuts down, the server releases the cart from the network and the cart no longer remains on the network. The cart can then be returned to the charging station.

What is claimed is:

1. An Auto Teller Shopping Cart comprising:

a metal structure having a rounded-rectangle upper frame made of a hollow rectangular rod with a rectangular strip cut off from each inward facing side, a rounded-rectangle lower frame made of a hollow rectangular rod, said upper and lower frames being attached by means of a corner support rounded-triangle hollow vertical rods, the four side between the said upper and lower frame and the bottom of the said lower frame being closed by solid metal sheets;

a rounded-rectangle bottom box made of metal and attached to the bottom of the said lower frame by means of the said vertical rods having circular holes on top and bottom surfaces, the said box being installed with a motherboard, a hard drive with installed operating system and programs, wireless networking communication device with signal sensor, fan, removable battery, an electronic power supply to charge battery, a power switch and a slot to connect scanner wires, the rear bottom of the said bottom box attached to the said vertical rods with holes on the top surface of each rod and a circular hole on left hand side of the rod connected to the left side of the said box and on the right hand side of the rod connected to the right side of the said bottom box;

a rectangular strip made of tinted glass or plastic to fit in the said cut off section of the upper frame;

a strip equipped with a group of barcode scanners, the said strip installed inside the sides said upper frame by means of strip holding slot;

a pair of handles made of hollow metallic circular rods attached to the rear corners of the cart at the said lower frame; moves up and out and then takes inverted-V shape a pair of thick metal strip angular support, connected between the bottom corners of the said top frame and around the bottom of the said handles, the said angular support inclines down from the said frame and then bent down to connect to the handles;

a touch-screen display attached between the rear top of the said frame and the handles around the center, the display being installed on the said support strips by means of screws;

rear wheels made of rubber attached to the rear bottom corners of the said frame, the wheels being connected to the ends of a circular rod passing through the said rods connected to the bottom of the said bottom box;

front wheels made of rubber attached to the front bottom corners of the said bottom box by means of electric welding, the wheels being able to rotate.

2. The rounded-rectangle box of claim 1 further comprises;

a left side with a power switch, an electronic power supply to charge battery and a lock, the side being able to be opened and provide access to the hard-drive and the mother board;

a right side with a lock and ventilation, the side being able to be opened and provide access to the fan;

a front side with a rectangular strip cut-off, the cut-off section fitted with tinted glass or plastic and provide access to the wireless network signal sensor;

a rear side with lock, the side being able to be opened and provide access to scanner wire and display wires connection slot, the side also provide access to the motherboard.

* * * * *